Patented Oct. 4, 1932

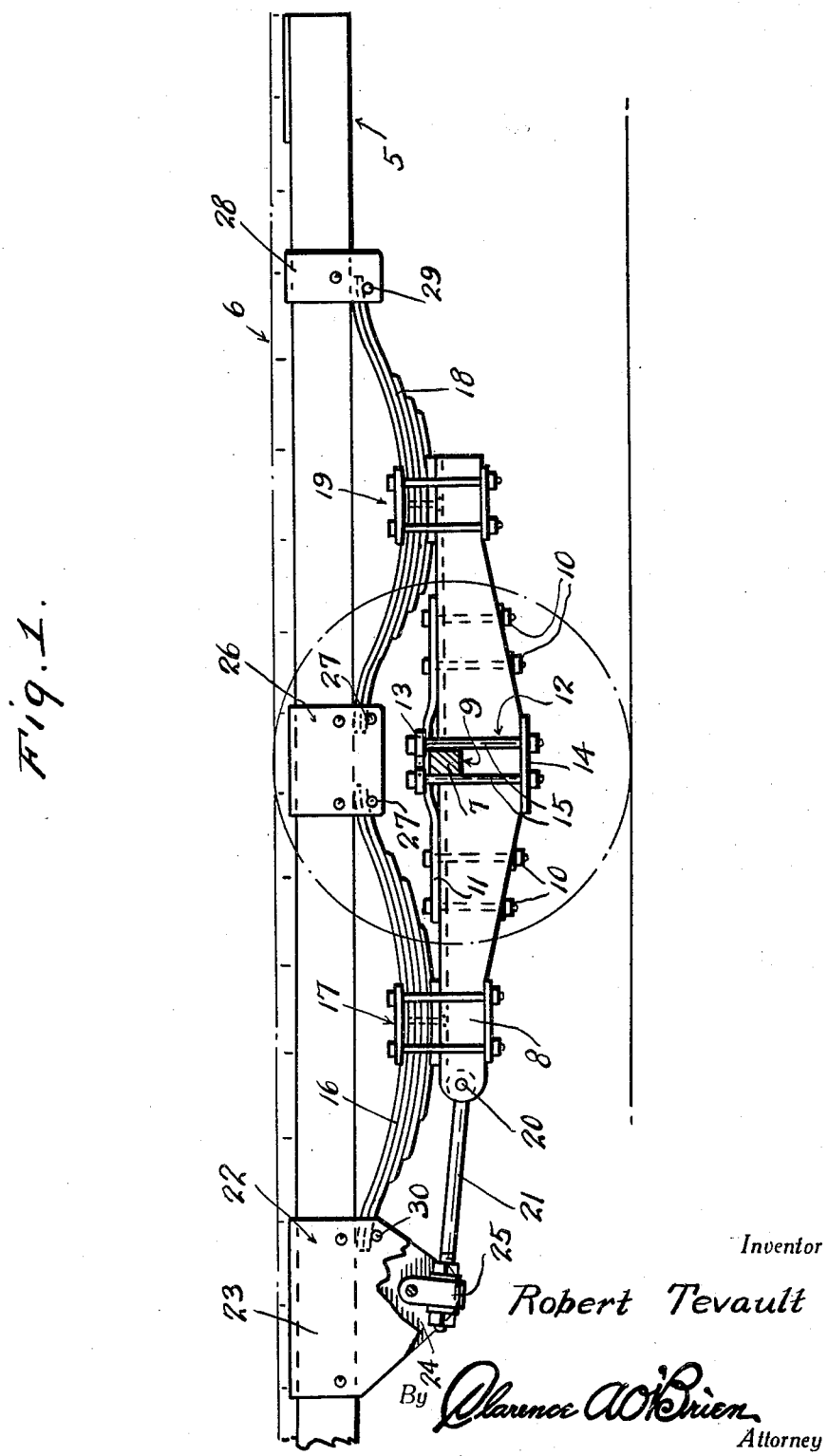

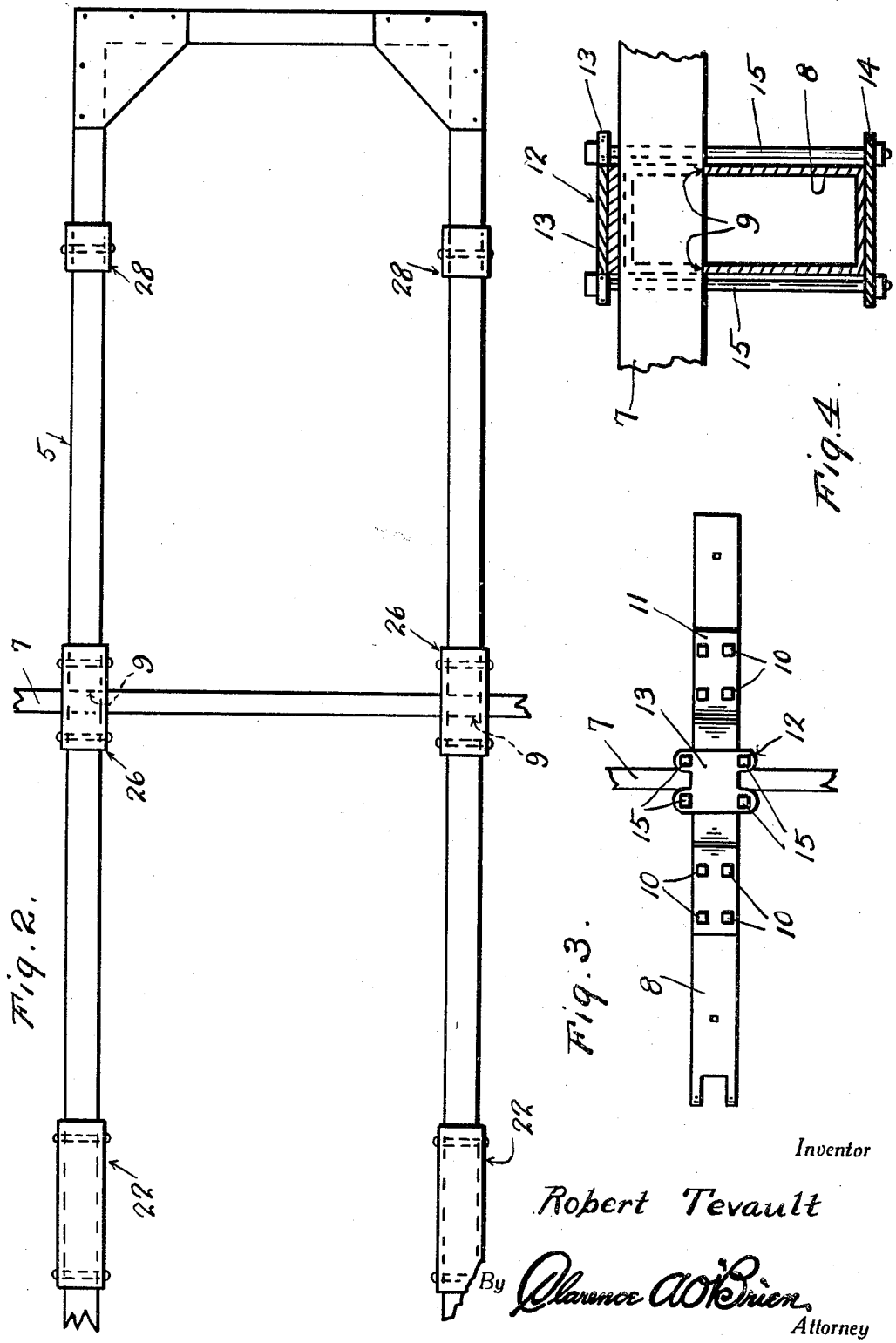

1,880,530

UNITED STATES PATENT OFFICE

ROBERT TEVAULT, OF GALVESTON, TEXAS

SPRING SUSPENSION AND BOLSTER ENSEMBLE

Application filed March 24, 1931. Serial No. 524,980.

This invention relates to an improved method and mechanical means for operatively connecting a vehicle chassis with a wheel equipped axle support.

As stated in more specific terms, the inventive conception comprehends a novel organization of mechanical parts so connected together and associated as to provide a practical duplex spring suspension and axle connection between a wheel equipped axle and a superposed chassis or body.

In reducing the invention to practice, I have found it expedient to resort to a unique structural ensemble of parts characterized by a horizontal bolster suspended from a multiple wheeled axle and functioning as a cantilever truss to support a pair of companion semi-elliptical leaf springs disposed in longitudinal tandem arrangement.

This improved structural cantilever spring support with the springs in tandem association is particularly adaptable for installation on a low-slung body or chassis, especially a platform type of vehicle generally referred to as a semi-trailer, used for draying bails of cotton.

The specific advantageous results and details constituting the novelty of the approved assembly will become more readily apparent from the following description and drawings.

In the drawings:

Figure 1 is a view in section or elevation showing a complete double-acting spring ensemble located on one side of the chassis of a semi-trailer.

Figure 2 is a top plan view with the platform removed to expose the understructure.

Figure 3 is a detail top plan view showing the bolster, bridge plate, intersecting single axle, and axle bonding clamp.

Figure 4 is a vertical sectional view through the arrangement showing the axle seated in the bolster seat.

An understanding of the invention may be had by considering a single side of the chassis since the arrangement is duplicated on each side. For the purpose of illustration I have shown a chassis provided with a platform, this being a type of wheeled support which is employed to facilitate loading and unloading of bailed cotton and analogous merchandise.

In Figure 1, the chassis frame is denoted generally by the ordinal 5 and the platform indicated at 6. One of the wheels is indicated in dotted lines. The axle, which is of the single type is represented at 7 and is here shown as rectangular in cross section, the wheel being mounted for rotation in any practical way.

I first call attention to the longitudinally elongated horizontally disposed bolster represented by the numeral 8. This is designed to have a cantilever action and is located to equalize distribution of strain and stress. In accordance with the invention, it is hollow and box-like in cross section and formed centrally with a notch which constitutes a seat as indicated at 9, said seat receiving the axle 7 as represented in Figure 4.

Bridging the axle and secured by bolts 10 to the bolster is a bridge plate 11 of the proportions illustrated in Figure 3. This has its central crown portion bonded to the bolster by way of a fastening which may be designated generally as a clamp, the same being indicated at 12. It comprises a head plate 13 and a base plate 14, these plates being fastened together by connecting bolts 15 arranged in pairs on opposite sides of the axle. The plate 13 overlies the central portion of bridge plate 11 whereas the base plate 14 underlies the corresponding central portion of the bolster. This applies the load in a desirable manner.

The front semi-elliptic leaf spring is represented by the numeral 16 and this is secured by an appropriate clip 17 to the front end portion of the bolster. The rear spring is distinguished by the numeral 18 and is fastened centrally by the companion clips 19. The frontal end portion of the bolster is bifurcated and fastened by pivot pin 20 between the furcations to a torque rod 21.

I now call attention to the numeral 22 which represents a saddle or hanger suspended from the chassis bar and having its flanges 23 and 24 shaped to accommodate an anchor 25 for the front end of the torque rod 21.

Just above the axle is a double-acting bracket or hanger 26 designed for convenient anchorage of the adjacent ends of the springs 16 and 18 respectively. The numerals 27 designate confining pins for the end leaves of the springs. A similar anchor or hanger is indicated by the numeral 28 and this is provided with a retention pin 29 to accommodate the rear end of the rear spring 18. Also there is a similar pin at 30 carried by the hanger 22 for retaining the adjacent end portion of the front spring 16. The central portions of the springs are thus clipped to the end portions of the bolster. The bolster is clamped to the axle and the clamping action is armored by the presence of the reinforcing and stress distributing bridge plate 11.

There are no shackles for the springs. The end portions of the springs are merely confined between the chassis bars and the retention pins carried by the several hangers 22, 26 and 28 respectively. The hanger 22 has the additional function of providing convenient anchorage for the front end of the torque rod 21.

The invention is designed for use on any kind of a vehicle carrying heavy loads where it is desirable to have the bed of such a vehicle close to the ground. The drawings show this spring support as particularly adapted to a semi-trailer used for the draying of cotton. Its advantages are first, that it controls the side rocking of the trailer or truck body to a minimum; second, it gives double strength to the body; third, it brings the bed of the trailer twelve to sixteen inches closer to the ground than any other device in use, fourth, it makes loading and unloading easier, thereby eliminating much extra labor; fifth it is adaptable to any kind of a low-slung body; sixth, it is adaptable to springs with or without shackles.

Particular attention is called to the torque rod. This serves a number of purposes. It carries all of the strain of the pull and relieves the springs themselves entirely therefrom. It also keeps the springs in alignment horizontally with the bed of the truck so that if the truck bed should sag in the middle the back springs would still carry an equal amount of weight with the front springs. In other words, it enables the spring suspension to do nothing except carry the load without any other strain at all and in the same manner under whatever varying conditions may be met.

In considering the entire ensemble collectively, it will be observed that the equipment selected for my purpose affords dependable anchorage and promotes security in construction and makes the complete structure particularly apt to serve the desired purposes in a practical manner. The duplex or tandem arrangement of the spring is designed to relieve the spring of laborious tasks to which they would otherwise be subjected. Yet the springs are restrained from displacement without requiring the employment of friction producing shackles.

I shall not however attempt to explain the theory in which the load and stress and strain are distributed for this will be obvious to persons skilled in the art to which the invention relates.

It is thought that the description taken in connection with the drawings will enable a clear understanding of the invention to be had. Therefore, a more lengthy description is thought unnecessary.

While the preferred embodiment of the invention has been shown and described, it is to be understood that minor changes in shape, size, and arrangement of parts, coming within the field of invention claimed may be resorted to in actual practice, without departing from the spirit and scope of the appended claims.

I claim:

1. In a structural arrangement of the class described, in combination, a wheel supported axle, a horizontally disposed longitudinally elongated bolster having a central notch in its upper edge constituting a seat, said axle being disposed in said seat, a bridge plate bolted to the bolster on opposite sides of the axle and having its central portion overlying said axle, a clamp connected to the central portion of the bridge plate and corresponding portion of the bolster to bond the axle in said seat, a chassis supported above the axle and bolster, a pair of semi-elliptic leaf springs having their central portions seated on the ends of the bolster, clips securing the central portions of said springs to the end portions of the bolster, and a plurality of longitudinally arranged hangers on the chassis provided with restraining pins, said pins holding the free end portions of the springs between themselves and portions of the chassis.

2. In a structural arrangement of the class described, in combination, a wheel supported axle, a horizontally disposed longitudinally elongated bolster having a central notch in its upper edge constituting a seat, said axle being disposed in said seat, means for holding the axle in said seat, a chassis supported above the axle and bolster, a pair of semi-elliptic leaf springs having their central portions seated on the ends of the bolster, clips securing the central portions of said springs to the end portions of the bolster, and a plurality of longitudinally arranged hangers on the chassis provided with restraining pins, said pins holding the free end portions of the springs between themselves and parts of the chassis, a torque rod pivoted to the front end of the bolster and attached to the front hanger at its opposite end.

In testimony whereof I affix my signature.

ROBERT TEVAULT.